L. DATHIS.
Running-Gear for Carriages.

No. 211,135.  Patented Jan. 7, 1879.

UNITED STATES PATENT OFFICE.

LÉON DATHIS, OF PARIS, FRANCE.

IMPROVEMENT IN RUNNING-GEAR FOR CARRIAGES.

Specification forming part of Letters Patent No. 211,135, dated January 7, 1879; application filed November 1, 1878.

*To all whom it may concern:*

Be it known that I, LÉON DATHIS, of Paris, France, have invented a new Improvement in Land-Carriages; and I do hereby declare the following, when taken in connection with the accompanying drawings and the letters of reference marked thereon, to be a full, clear, and exact description of the same, and which said drawings constitute part of this specification, and represent, in—

Figure 1:
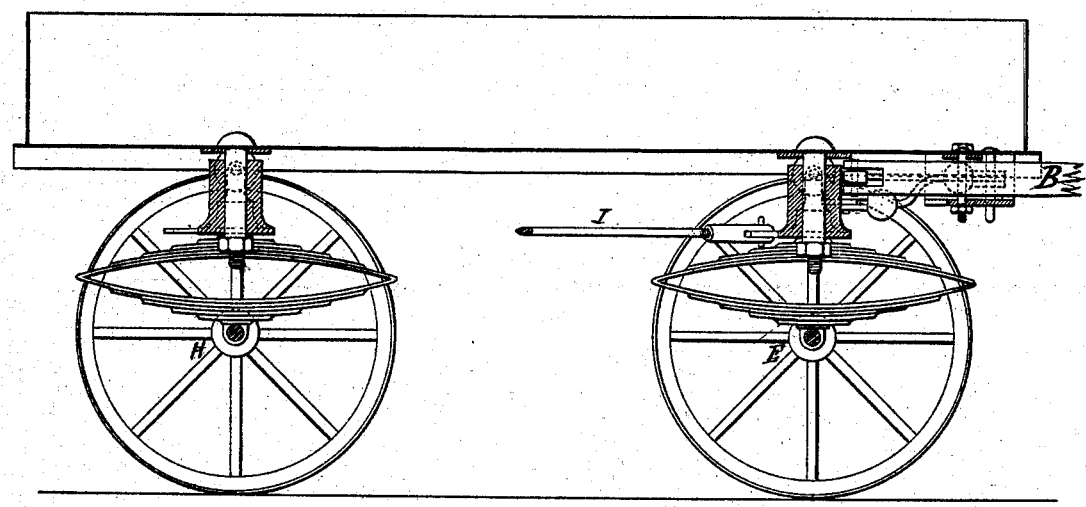
Figure 2:
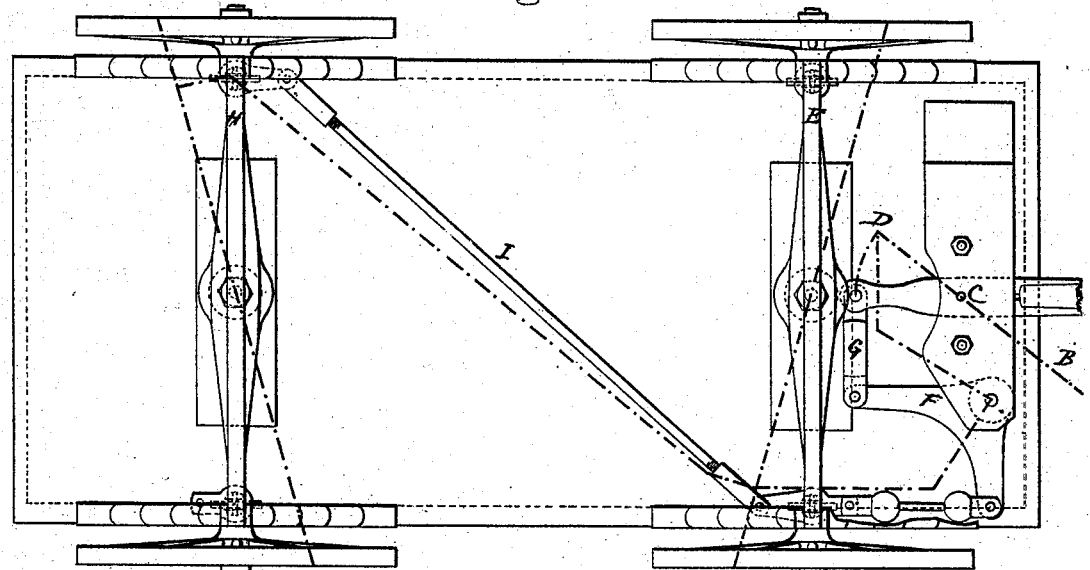

Figure 1, vertical section; Fig. 2, inverted plan.

This invention relates to an improvement in land-carriages, in which the forward axle is usually the only one pivoted. Hence, when vehicles run in curves the traction is not applied, and the direction of the axle does not correspond with that of the radius of the curve.

The object of this invention is to overcome this difficulty; and consists in connecting the two axles together and to the traction-pole, so as to effect the adjustment of both axles, that in moving in a curve the axles may stand in substantially radial lines of said curve.

In the accompanying drawings, B is the pole or point of traction. It is pivoted at C. The two axles E H are both pivoted in the same central line with the pole, and are connected together by a rod, I, hinged to the forward axle at one side of its pivot, and hinged to the rear axle at a point equidistant from the other side of the center, so that the turning of one axle turns the other in the opposite direction, or so that if prolonged the axial line of both axles would meet at the center of the curve which the wheels describe in moving.

The pole is connected to the forward axle by a bell-crank lever, F, pivoted to the body, one arm connected to the axle and the other arm to the pole by connections G. Hence, as the pole turns to the position indicated in broken lines, the bell-crank lever correspondingly turns the forward axle, and that in turn imparts a like movement to the rear axle, as indicated by the position in broken lines, which are radial lines of the curve traveled.

I claim—

The combination of the two axles of a carriage, each centrally pivoted to the body, with draft-connection B, also pivoted to the body, and the bell-crank lever F, connection G, and tie I, substantially as described.

In testimony whereof I have signed my name to this specification before two subscribing witnesses.

LÉON DATHIS.

Witnesses:
 ROBT. M. HOOPER,
 CHARLES MARDELET.